US005746969A

United States Patent [19]
Schönfelder et al.

[11] Patent Number: 5,746,969
[45] Date of Patent: May 5, 1998

[54] PROCESS FOR THE PRODUCTION OF DENSE SILICON NITRIDE MATERIALS

[75] Inventors: Lothar Schönfelder, Coburg; Gerhard Leimer, Rödental; Stefan Roth, Coburg, all of Germany

[73] Assignee: Bayer AG, Leverkusen, Germany

[21] Appl. No.: 726,750

[22] Filed: Oct. 7, 1996

Related U.S. Application Data

[63] Continuation-in-part of Ser. No. 322,589, Oct. 13, 1994, abandoned.

[30] Foreign Application Priority Data

Oct. 25, 1993 [DE] Germany .................. 43 36 311.3

[51] Int. Cl.$^6$ .................. C04B 33/32; B28B 1/24; B28B 1/26

[52] U.S. Cl. .................. 264/645; 264/647; 264/651
[58] Field of Search .................. 264/645, 647, 264/651

[56] References Cited

U.S. PATENT DOCUMENTS

| | | | |
|---|---|---|---|
| 5,213,729 | 5/1993 | Elder et al. | 264/647 |
| 5,275,985 | 1/1994 | Huang | 264/647 |

*Primary Examiner*—Christopher A. Fiorilla
*Attorney, Agent, or Firm*—Connolly & Hutz

[57] ABSTRACT

A process for the production of dense silicon nitride materials by the nitriding of moulded bodies of silicon powder, silicon nitride powder and sintering additives under normal pressure and sintering of the moulded bodies at normal nitrogen pressure as well as silicon nitride materials produced correspondingly.

16 Claims, No Drawings

PROCESS FOR THE PRODUCTION OF DENSE SILICON NITRIDE MATERIALS

CROSS-REFERENCE TO RELATED APPLICATION

The present application is a continuation-in-part of U.S. patent application Ser. No. 08/322,589 that was filed on Oct. 13, 1994, now abandoned, in the names of Lothar Schonfelder, Gerhard Leimer and Stefan Roth.

The present invention relates to a process for the production of dense silicon nitride materials by the nitriding of moulded bodies of silicon, silicon nitride and sintering additives under normal pressure and sintering of the moulded bodies at normal nitrogen pressure as well as silicon nitride materials produced correspondingly.

Silicon nitride ceramics are interesting for various applications on the basis of their outstanding properties in the high-temperature range. A prerequisite for these applications, however, is low-cost processes for the production of corresponding silicon nitride components.

The best-known process for the production of silicon nitride ceramics consists in the processing of mixtures of finely-divided silicon nitride powders with suitable sintering aids by forming processes such as compaction, slip casting or injection moulding to moulded bodies and then dense sintering the moulded bodies at high temperatures of 1800° to 1950° C. At these high temperatures the sintering process is carried out under nitrogen gas pressure also in order to avoid decomposition of the silicon nitride. If, however, this sintering is carried out at normal pressure, the sintered bodies must also be embedded in suitable protective beds of powder in order to avoid the decomposition of the silicon nitride. These protective beds of powder comprise silicon nitride powder, sintering aids and inert materials such as boron nitride in order to avoid the sintering of the bed of powder. However, on the basis of the high raw material costs for finely divided silicon nitride powder and the use of expansive high-pressure gas-sintering plants, the above-mentioned process has considerable disadvantages for the low-cost production of silicon nitride materials. The use of protective beds of powder represents a further cost factor in addition. These powders cannot be reused indefinitely, owing to ageing effects (vaporization processes, sintering processes, oxidation). In addition, the protective beds of powder make a homogeneous temperature distribution in large sintering plants much more difficult to achieve. As a result of this inhomogeneous temperature distribution, there arise density gradients in the ceramic components or density differences within a furnace batch. In addition, the use of the protective bed of finely divided powder greatly complicates the charging and discharging of the sintering furnace. The use of the voluminous protective powders with low bulk densities, furthermore, leads to an uneconomic space-time yield for the sintering process.

A further possibility of sintering, as has been mentioned, is the application of high gas pressures (gas pressure sintering) or hot isostatic pressing (HIP). In the course of this the decomposition of the silicon nitride is suppressed by the use of the elevated nitrogen pressure and sintering can be carried out at elevated sintering temperatures. The elevated nitrogen pressure does not, however, prevent the vaporisation of the sintering additives from the specimen. This vaporisation is also further intensified by the increased sintering temperatures. This leads to the risk of an inhomogeneous specimen composition as a result of concentration gradients of the sintering additives in the specimens. This in turn results in property fluctuations in the sintered ceramic. It is sought by the prior art to suppress these decomposition processes by the use of protective beds of powder that contain the sintering additives concerned as well as silicon nitride. As already mentioned, however, that represents an additional cost factor and also leads to problems with larger furnace charges.

By comparison with the use of silicon nitride powders as raw material, the use of silicon powders, on the other hand, is far less costly. However, this process, the so-called reactive bonding of silicon, has the disadvantage that the silicon must initially, before the sintering process, be converted with nitrogen to silicon nitride before the body, which is then still porous, can be compacted by sintering. However, this exothermic nitriding reaction requires very slow reactions in order to avoid a rise of temperature above the melting point of silicon and therefore a melting down of the silicon. The result, especially in the case of thick-walled parts and also owing to the slow diffusion of the nitrogen into the interior of the part, is very long reaction times. Thick-walled parts or high densities of the silicon raw pieces can also lead to incomplete nitriding processes.

Processes are described that are said to shorten these unfavorably long nitriding times. Thus, the nitriding of silicon by admixture of silicon nitride powder is disclosed in U.S. Pat. No. 4,500,482. The admixed silicon nitride powder absorbs the heat of reaction, as a result of which an accelerated nitriding can be carried out. The sintering becomes uneconomical again, however, as a result of an expensive high-pressure process (encapsulated hipping). The process according to EP-A 377408 also describes the nitriding of silicon/silicon nitride mixtures, but with the use of high pressures of 0.5 to 4.9 MPa, because of which special pressure apparatuses are necessary. This high-pressure process is said also to permit the rapid nitriding of thick moulded bodies.

According to EP-A 79908, the sintering of nitrided bodies is facilitated by grinding silicon powder in the presence of silicon nitride. The silicon is ground by a wet-grinding process to average grain sizes below 1 μm. By the use of these extremely finely divided silicon powders the nitriding is said to be accelerated and the sintering process facilitated. However, this process also presents drawbacks for a low-cost production process. Firstly, protective beds of powder must be used during the sintering; furthermore, silicon must be very finely ground by a wet grinding process. Because of the sensitivity of silicon to hydrolysis, this grinding must be carried out in anhydrous organic solvents. In addition, these grindings must be carried out in grinding vessels of silicon nitride with silicon nitride grinding balls in order to exclude the contamination by impurities resulting from the grinding operation. In order to accelerate the nitriding, iron-containing silicon powders also are used. However, these iron impurities, as is known, lead to inhomogeneities in the silicon nitride material and therefore to an impairment of the mechanical strengths and a lowering of the Weibull modulus.

Investigations on the cause of fracture in sintered silicon nitride specimens show that iron is found in these specimens in fairly large accumulations and that these inhomogeneities in the material have a fracture initiating effect and a negative influence on the material properties.

The object therefore was to provide a process by which silicon raw material powders with the lowest possible iron content can be used for the nitriding process, but by which nevertheless an economically rapid nitriding process can be carried out, with simultaneous improvement of the material properties.

It has surprisingly been found that by the use of silicon powders of average grain sizes of 1 to 20 µm a rapid nitriding process can be carried out under normal nitrogen pressure of 1 bar and in addition sintering is made possible under normal nitrogen pressure and without the use of protective beds of powder.

This invention therefore provides a process for the production of dense silicon nitride materials by the nitriding under normal pressure of moulded bodies of mixtures of silicon, silicon nitride and sintering additives and the sintering of the moulded bodies at normal nitrogen pressure without a protective bed of powder, wherein the average grain size of the silicon powder is 1 to 20 µm.

This process provides the prerequisites for a low-cost production process. Special high-pressure plants are not necessary, either for the nitriding or for the sintering process. Silicon powders usable for the process according to the invention can be produced by dry grinding processes without the use of solvents. This is done e.g. by the so-called opposed-jet milling process. The use of the silicon powder according to the invention of average grain sizes of 1 to 20 µm offers advantages above all for the shaping processes of slip casting and injection moulding. More finely divided silicon powders are disadvantageous for -the injection moulding process. By reason of the very finely divided state the binder requirement is increased. As a result, the green density of the injection moulded bodies is reduced and above all the baking-out process for the organic binder is made more difficult by reason of the high binder content. Too high an organic binder component leads during the baking-out process to the formation of defects such as bubbles and cracks. In the case of slip casting, finely divided silicon powder leads above all to an increased reactivity to water. As a result of the hydrolysis reaction between silicon and water, hydrogen gas is formed and there is therefore an increased pore formation in the slip-casted moulded bodies. Very finely divided silicon powder certainly has good nitriding properties, but in slip casting the formation rate of body is drastically reduced by reason of an increased filtration resistance. Simultaneously, the green density of the moulded bodies is unfavorably reduced.

The process according to the invention has a particularly advantageous effect with regard to a rapid nitriding process, and the nitriding can also be carried out at a relatively low temperature. According to a preferred embodiment of the process of the invention, the nitriding is carried out at temperatures of 1000° to 1450° C. under normal nitrogen pressure in a reaction time of less than 30 hours.

By the process according to the invention, even silicon bodies with wall thicknesses of more than 5 mm, preferably more than 10 mm, can be completely nitrided in extremely short nitriding times under normal nitrogen pressure. This rapid nitriding is possible even with low-iron silicon powders, advantageously with iron contents below 0.7 wt. %. By the use of the mixture according to the invention of silicon nitride powder and silicon powder with average grain sizes of 1 to 20 µm, there is formed in the moulded bodies a suitable pore structure that permits a diffusion of the nitrogen reaction gas into the internal zones of the moulded part, even with rapid nitriding processes and large wall thicknesses.

The term "silicon nitride powder", as used herein, is meant to include particles wherein none of the dimensions (e.g., length, height, width or diameter) is significantly larger (i.e., more than 2 or 3 times larger) than the other dimensions (or at least the average dimensions if the particle shape is complex) and does not include needles, fibers or whiskers of silicon nitride, as those terms are commonly used in the art. Such needles, fibers and whiskers can be identified by their elongated or columnar shape which provides them with a length dimension that is significantly larger than their average cross-sectional dimension (i.e., the cross-sectional dimension that is roughly perpendicular to the length dimension). In most cases, the length dimension of the needles, fibers or whiskers is much greater than their cross-sectional dimension (i.e., more than 3 times as large). In a preferred embodiment of the present invention, the overall shape of the silicon nitride powder is spherical or nearly spherical (i.e., particles which have an isotropic or near isotropic shape).

The silicon nitride matrix developed by the nitriding process is, surprisingly, sufficiently finely divided and therefore sufficiently active in sintering. This high sintering activity of the nitrided moulded body permits a dense sintering of the parts, advantageously even at temperatures below 1800° C. Elevated nitrogen pressures are therefore unnecessary for this sintering process. By reason of the relatively low sintering temperatures the decomposition of the silicon nitride or the vaporization process of the sintering additives used is drastically reduced, so that inhomogeneities in the material are avoided.

The process described permits the dense sintering of the nitrided parts, advantageously already at 1 bar normal nitrogen pressure. It turns out advantageously in the course of this, furthermore, that no protective bed of powder is necessary in this sintering process.

In a preferred embodiment of the process according to the invention, the normal pressure sintering is carried out at temperatures of 1630° to 1830° C.

Since the process according to the invention can be carried out without the use of the complicated, cost-intensive, protective beds of powder, it also becomes possible for the nitriding and sintering processes to be carried out in one step, i.e. in one furnace, without an intermediate cooling process. Since the specimens can be placed in the high-temperature furnace without a protective bed of powder, the nitriding can take place at first and then, by raising the temperature, the sintering subsequently. The use of protective beds of powder, as is necessary according to the prior art hitherto to prevent the decomposition of the silicon nitride during the sintering, does not permit or it makes very difficult the nitriding process connected upstream. As a result of the embedment in the dense protective beds of powder, the access of the reactive gas nitrogen during the nitriding is hindered and the removal of the heat of reaction made difficult. This leads in turn to a drastic increase of the nitriding times, above all in the case of thick-walled parts or highly-charged production furnaces.

By the process according to the invention of nitriding and sintering without the use of protective beds of powder, a better space-time yield for the production of silicon nitride parts is achieved.

The oxides or nitrides usually can be used as sintering aids for the process according to the invention for the production of dense silicon nitride parts. Mixtures of $Y_2O_3$ and $Al_2O_3$ as well as mixed systems of $Y_2O_3$, $Al_2O_3$ and MgO have proved particularly advantageous.

Particularly good results are obtained when the mixture used comprises 2 to 60 wt. % silicon nitride powder, 40 to 95 wt. % silicon powder and up to 20 wt. % (i.e., a maximum of 20 wt. %) sintering additives. In this case, rare earth oxides, which can be partially replaced by oxides of aluminum and/or magnesium, can advantageously be used as sintering additives. In a preferred embodiment of the present invention, the mixture used comprises 2–59 wt. % silicon nitride powder, 40–95 wt. % silicon powder and from 1 to 20 wt. % sintering additives. In a highly preferred embodiment of the present invention, the mixture used comprises 2 to 58 wt. % silicon nitride powder, 40 to 95 wt. % silicon powder and from 2–20 wt. % sintering additives.

The invention also provides sintered materials obtainable by the process according to the invention that are characterised in that their sintered density exceeds 95% of the theoretical density, the room temperature bending strength exceeds 650 MPa and the Weibull modulus exceeds 10.

The invention is explained in the following by means of examples, which are not to be regarded as limiting it.

EXAMPLE 1

A mixture of 59 wt % silicon, nitrogen-1-point method, (DIN 66131),: Specific surface area=3.1 m$^2$/g, iron content 0.25 wt %.

11.2 wt % yttrium oxide Specific surface area=13.6 m$^2$/g 2.8 wt % aluminium oxide Specific surface area=7.8 m$^2$/g 27 wt % silicon nitride powder Specific surface area=13.5 m$^2$/g was homogenised by dispersion in isopropanol with aluminium oxide balls on a roller bench for 48 hours. The BET specific surface area of the homogenised mixture was 7.2 m$^2$/g. It is clear by comparison with the specific surface area of the raw materials used that this dispersion has merely produced a homogenisation. Taking into account the specific surface areas of the raw materials used, a specific surface area of 7.1 m$^2$/g for the mixture is calculated. Thus, no grinding of the silicon powder occurred.

The powdery mixture was mixed with 17 parts by weight of a thermoplastic injection moulding plasticiser in a heatable kneader. For further homogenisation, the injection moulding dispersion was then extruded with a twin-screw extruder. After size-reduction, this extruded mixture was processed with an injection moulding machine to form beaker-shaped components. The dimensions of the injection-moulded parts were: maximum wall thickness of the cylindrical surface=3.6 mm, maximum wall thickness of the base=5.6 mm, external diameter=41.4 mm. After the injection moulding, the organic injection-moulding plasticiser was baked out by heating in air at temperatures up to 450° C. The baked-out components were nitrided under normal nitrogen pressure with the following temperature sequence:

In vacuum, 3.5 hours up to 800° C.; under 1 ar nitrogen, 1.5 hours up to 1170° C., 4 hours up to 1370° C., 1 hour pause, 2 hours up to 1450° C., 10 hours pause.

The increase in weight after this nitriding process was more than 95% of the theoretical: a sufficiently complete nitriding had therefore occurred. The nitrided parts were sintered at the following conditions under an atmosphere of normal-pressure nitrogen:

In vacuum, 70 minutes up to 1200° C., 30 minutes pause; under 1 bar nitrogen, 55 minutes up to 1750° C., 90 minutes pause; cooling down, 90 minutes down to 600° C.

In the course of this the components were placed in carbon crucibles without embedding in powder. The density of the sintered components was 3.29 g/cm$^3$, corresponding to 99.6% of the theoretical density. Test pieces were sawn from the bases for measurements of bending strength. The following properties were determined thereon:

Room-temperature bending strength: 760±54 MPa (4-point, 20/10 support)

Weibull modulus: 15.7

Kl$_C$: 7.6 MPa×m$^{1/2}$ (Vickers hardness impression)

Vickers hardness 15.9 GPa (load 200 N)

The change in weight as a result of the sintering process was −0.6%. This means that the performance according to the invention with normal pressure sintering, despite sintering without a protective bed of powder, leads to no noteworthy vaporisation losses of Si$_3$N$_4$.

These characteristic values of the material, above all the small spread of the strength at high Weibull modulus, highlight the homogeneous quality of the material according to the process of the invention.

EXAMPLE 2

A raw material mixture of the same composition as in Example 1 was moulded by cold isostatic compaction (compacting pressure=1500 kp cm$^{-2}$) to hollow cylindrical bodies of the following dimensions:

Height, 3.9 cm; internal diameter, 2.4 cm; external diameter, 6.6 cm.

The moulded rings, with a wall thickness of 2.1 cm, were nitrided under normal nitrogen pressure with the following nitriding programme:

Vacuum, 3.5 hours up to 800° C.; 1 bar nitrogen, 1.5 hours up to 1170° C., 8 hours up to 1370° C., 5 hours pause.

The nitrided samples were sintered comparably to Example 1 under an atmosphere of nitrogen at normal pressure in carbon crucibles without a protective bed of powder.

In the course of this the following sintering programme was employed:

70 minutes up to 1200° C., 30 minutes pause under vacuum; 1 bar nitrogen, 55 minutes up to 1750° C., 8 hours pause; cooling down, 90 minutes down to 600° C.

From the sintered rings, 20 sample pieces were prepared on which the following properties were determined:

Sintered density: 3.27 g/cm$^3$, corresponding to 99.0% of the theoretical density Room-temperature bending strength: 950±89 MPa (4-point, 20/10 support)

Weibull modulus: 14.3

Kl$_C$: 9.0 MPa×ml$^{/2}$ (Vickers hardness impression)

Vickers hardness: 16.0 GPa (load 200 N)

EXAMPLE 3

Injection moulded components were produced as in Example 1. However, the baked-out parts were both nitrided and sintered at normal nitrogen pressure in one furnace without transferring. In the course of this the parts were placed in carbon crucibles without embedding in protective powder. The combined nitriding and sintering process was carried out with the following temperature programme:

Vacuum, 3.5 hours up to 800° C.; N$_2$, 1.5 hours up to 1170° C., 4 hours up to 1370° C., 1 hour pause, 2 hours up to 1450° C., 10 hours pause, 0.5 hours to 1730° C., 1.5 hours pause; cooling down, 90 minutes down to 600° C.

The density of the sintered parts was 3.28 g/cm$^3$. On test pieces from the base there were determined:

Room-temperature bending strength: 824±86 MPa (4-point, 20/10 support)

Weibull modulus: 13.6

EXAMPLE 4

Beaker-shaped silicon nitride parts were produced by injection moulding, nitrided and sintered as in Example 1.

However, a coarser silicon powder also having reduced iron content was used:

Specific surface area=1.9 m²/g, nitrogen-1-point method (DIN 66131)

Average grain size=6.1 μm

Iron content=0.18 wt %

The raw material mixture was homogenised as in Example 1. The BET specific surface area of the homogenised mixture was 6.2 m²/g. Comparably thereto, the specific surface area calculated by taking into account the raw materials used is 6.4 m²/g. Comparison with the measured specific surface area after the homogenisation operation shows that in this process no grinding of the coarse silicon powder occurs.

The density of the sintered silicon nitride beakers was 3.27 g/cm³, corresponding to 99.1% of the theoretical density. On test pieces from the parts there were determined:

Room-temperature bending strength: 982±51 npa (4-point, 20/10 support)

Weibull modulus: 18.9

What is claimed is:

1. Process for the production of dense silicon nitride materials having a sintered density greater than 95% of the theoretical density and a room temperature bending strength that exceeds 650 MPa by nitriding of moulded bodies comprising mixtures of 40 to 95 wt % silicon powder, 2 to 60 wt % silicon nitride powder and 0 to 20 wt % sintering additives, said sintering additives being rare earth oxides which can be partially substituted by oxides of aluminum and/or magnesium, under normal atmospheric pressure and sintering of the moulded bodies under nitrogen at normal atmospheric pressure, wherein said nitriding and sintering are performed without the use of a protective bed of powder, and further wherein the average grain size of the silicon and silicon nitride powders is 1 to 20 μm, the iron content of the silicon powder is not more than 0.7 wt % and the silicon nitride powder does not include fibers or whiskers of silicon nitride.

2. Process according to claim 1, characterized in that the nitriding is carried out at temperatures of 1000° to 1450° C. and with a reaction time of less than 30 hours.

3. Process according to claim 2, characterized in that the sintering is carried out without a protective bed of powder at temperatures of 1630° to 1830° C.

4. Process according to claim 2, characterised in that the moulded bodies are produced by compaction, slip casting or injection moulding and have wall thicknesses of more than 5 mm.

5. Process according to claim 2, characterised in that the mixture used comprises 2 to 59 wt. % silicon nitride powder, 40 to 95 wt. % silicon powder and 1 to 20 wt. % sintering additives.

6. Process according to claim 1, characterized in that the sintering is carried out at a temperature of 1630° to 1830° C.

7. Process according to claim 1, characterized in that the moulded bodies are produced by compaction, slip casting or injection moulding and have wall thicknesses of more than 5 mm.

8. Process according to claim 1, characterized in that the nitriding and sintering are carried out in one furnace cycle under nitrogen at normal atmospheric pressure without the use of a protective bed of powder.

9. Process according to claim 1, characterized in that the moulded bodies are produced by compaction, slip casting or injection moulding and have wall thicknesses of more than 5 mm.

10. Process according to claim 1, wherein said sintering additives consist of a mixture of $Y_2O_3$ and $Al_2O_3$ or a mixture of $Y_2O_3$, $Al_2O_3$ and MgO.

11. The process of claim 1, wherein the moulded bodies comprise mixtures of 40 to 95 wt. % silicon powder, 2 to 59 wt. % silicon nitride powder and 1 to 20 wt. % sintering additives.

12. The process of claim 1, wherein the moulded bodies comprise mixtures of 40 to 95 wt. % silicon powder, 2 to 58 wt. % silicon nitride powder and 2 to 20 wt. % sintering additives.

13. Process for the production of dense silicon nitride materials having a sintered density greater than 95% of the theoretical density and a room temperature bending strength that exceeds 650 MPa by nitriding of moulded bodies comprising a mixture of:

a) silicon powder, b) silicon nitride powder, and c) sintering additives, wherein said sintering additives are rare earth oxides which can be partially substituted by oxides of aluminum and/or magnesium, further wherein said silicon powder is present in said mixture in an amount of from 40 to 95% by weight, said silicon nitride powder is present in an amount of from 2 to 60% by weight and the maximum amount of sintering additives present is 20% by weight, under normal atmospheric pressure and sintering of the moulded bodies under nitrogen at normal atmospheric pressure, wherein said nitriding and sintering are performed without the use of a protective bed of powder, and further wherein the average grain size of the silicon and silicon nitride powders is 1 to 20 μm, the iron content of the silicon powder is not more than 0.7 wt. % and the silicon nitride powder does not include fibers or whiskers of silicon nitride.

14. The process of claim 13, wherein the moulded bodies comprise mixtures of 40 to 95 wt. % silicon powder, 2 to 59 wt. % silicon nitride powder and 1 to 20 wt. % sintering additives.

15. The process of claim 13, wherein the moulded bodies comprise mixtures of 40 to 95 wt. % silicon powder, 2 to 58 wt. % silicon nitride powder and 2 to 20 wt. % sintering additives.

16. Process for the production of dense silicon nitride materials having a sintered density greater than 95% of the theoretical density and a room temperature bending strength that exceeds 650 MPa by nitriding of moulded bodies comprising mixtures of 40 to 95 wt. % silicon powder produced by a dry grinding process and without the use of solvents, 2 to 60 wt. % silicon nitride powder and 0 to 20 wt. % sintering additives, said sintering additives being rare earth oxides which can be partially substituted by oxides of aluminum and/or magnesium, under normal atmospheric pressure and sintering of the moulded bodies under nitrogen at normal atmospheric pressure, wherein said nitriding and sintering are performed without the use of a protective bed of powder, and further wherein the average grain size of the silicon and silicon nitride powders is 1 to 20 μm, the iron content of the silicon powder is not more than 0.7 wt. % and the silicon nitride powder does not include fibers or whiskers of silicon nitride.

* * * * *